United States Patent
Tsuji

(10) Patent No.: US 11,758,269 B2
(45) Date of Patent: Sep. 12, 2023

(54) ELECTRONIC APPARATUS REDUCED IN LOWERING OF FOCUS ADJUSTMENT ACCURACY, METHOD OF CONTROLLING SAME, AND STORAGE MEDIUM

(71) Applicant: CANON KABUSHIKI KAISHA, Tokyo (JP)

(72) Inventor: Ryosuke Tsuji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 17/668,855

(22) Filed: Feb. 10, 2022

(65) Prior Publication Data

US 2022/0264022 A1 Aug. 18, 2022

(30) Foreign Application Priority Data

Feb. 17, 2021 (JP) ................................ 2021-023506

(51) Int. Cl.
*H04N 23/67* (2023.01)

(52) U.S. Cl.
CPC .................................. *H04N 23/672* (2023.01)

(58) Field of Classification Search
None
See application file for complete search history.

(56) References Cited

U.S. PATENT DOCUMENTS

| | | | | |
|---|---|---|---|---|
| 2009/0146046 A1* | 6/2009 | Katsuda | ............... | H04N 23/672 250/201.6 |
| 2018/0213149 A1* | 7/2018 | Ohtsubo | ................ | H04N 23/75 |
| 2019/0296063 A1* | 9/2019 | Ichimiya | ................ | H04N 23/67 |

FOREIGN PATENT DOCUMENTS

JP 2005-318554 A 11/2005

OTHER PUBLICATIONS

Liu, et al., SSD: Single Shot MultiBox Detector, UNC Chapel Hill, Zoox Inc., Google Inc., University of Michigan, Ann-Arbor, Dec. 29, 2016, pp. 1-17, arXiv: 1512.02325V5, Cited in Paragraph [0003] of the Specification.

Chen, et al., DeepLab: Semantic Image Segmentation with Deep Convolutional Nets, Atrous Convolution,and Fully Connected CRFs, May 12, 2017, pp. 1-14, arXiv: 1606.00915V2, Cited in Paragraph [0003] of the Specification.

* cited by examiner

*Primary Examiner* — Cynthia Segura
(74) *Attorney, Agent, or Firm* — Cowan, Liebowitz & Latman, P.C.

(57) ABSTRACT

An electronic apparatus suppressed in occurrence of lowering of focus adjustment accuracy in a case where an occlusion area exists in an object area. An image is acquired which is captured using an image capturing device including a plurality of photoelectric converters to which are incident light fluxes via exit pupils of an image capturing optical system pupil-divided in first and second directions. An object and occlusion areas of the object are detected from the image. Focus adjustment is controlled based on phase difference information, according to a direction of distribution of the occlusion areas.

13 Claims, 11 Drawing Sheets

INPUT IMAGE

FIG. 3B
EXAMPLES OF AREA DIVISION
(1) AREAS OTHER THAN OBJECT 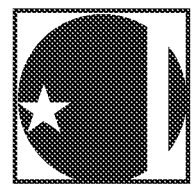
(2) FOREGROUND AREA OF OBJECT 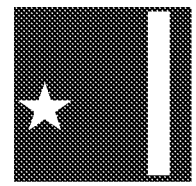
(3) AREAS CAUSING PERSPECTIVE CONFLICT 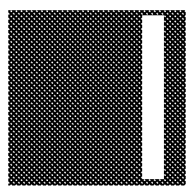

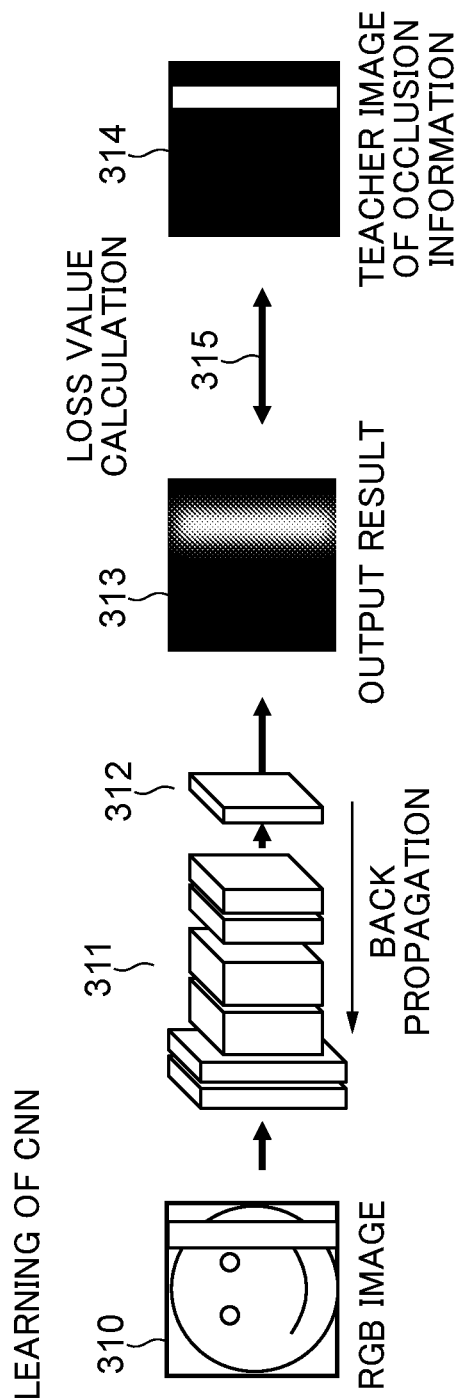

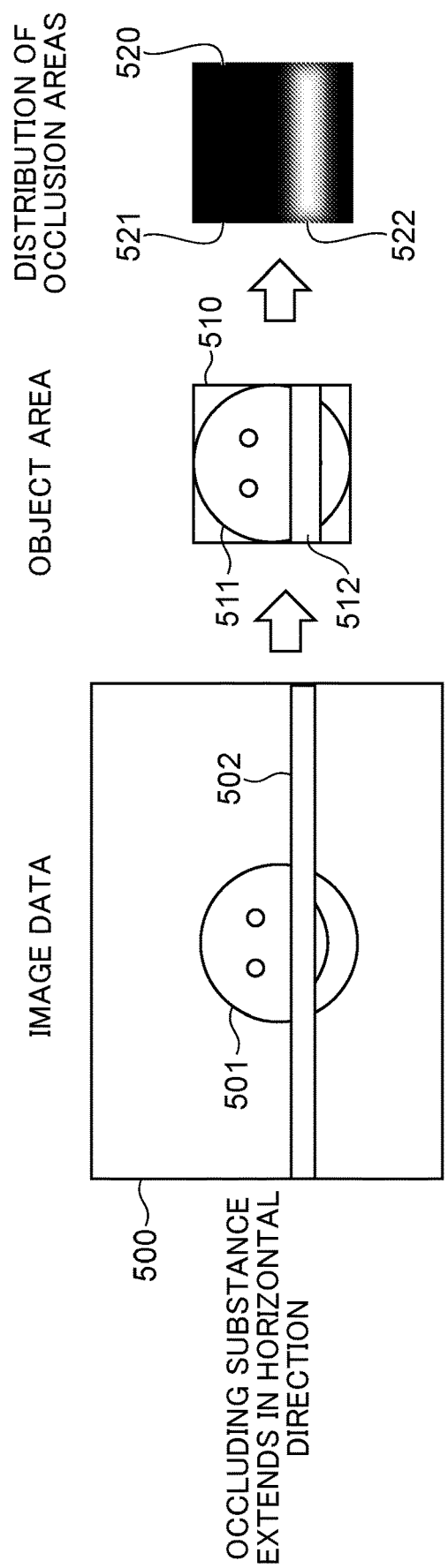

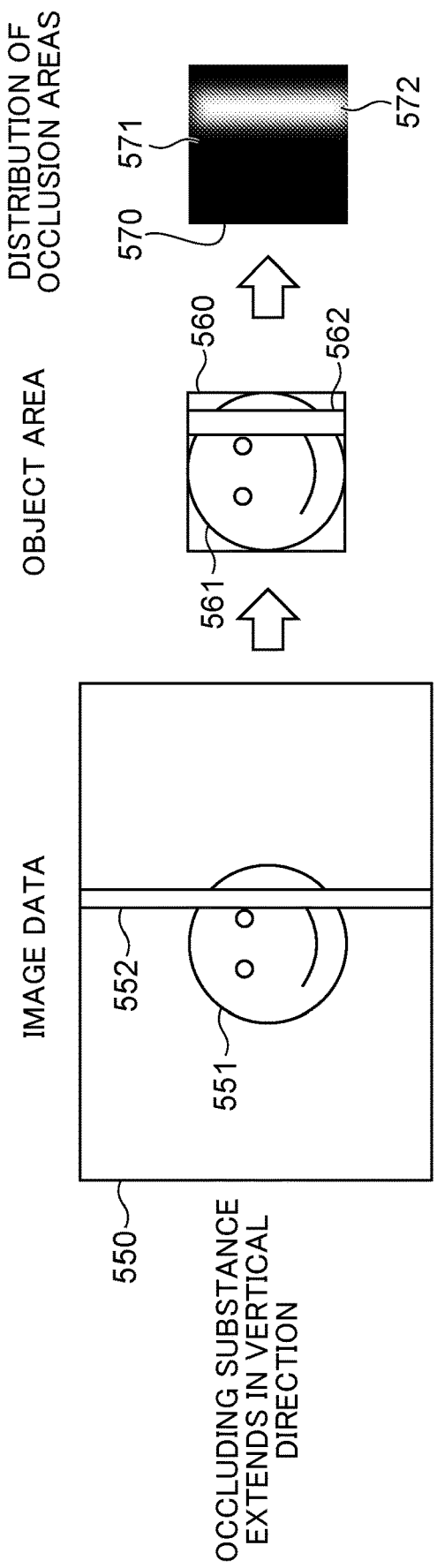

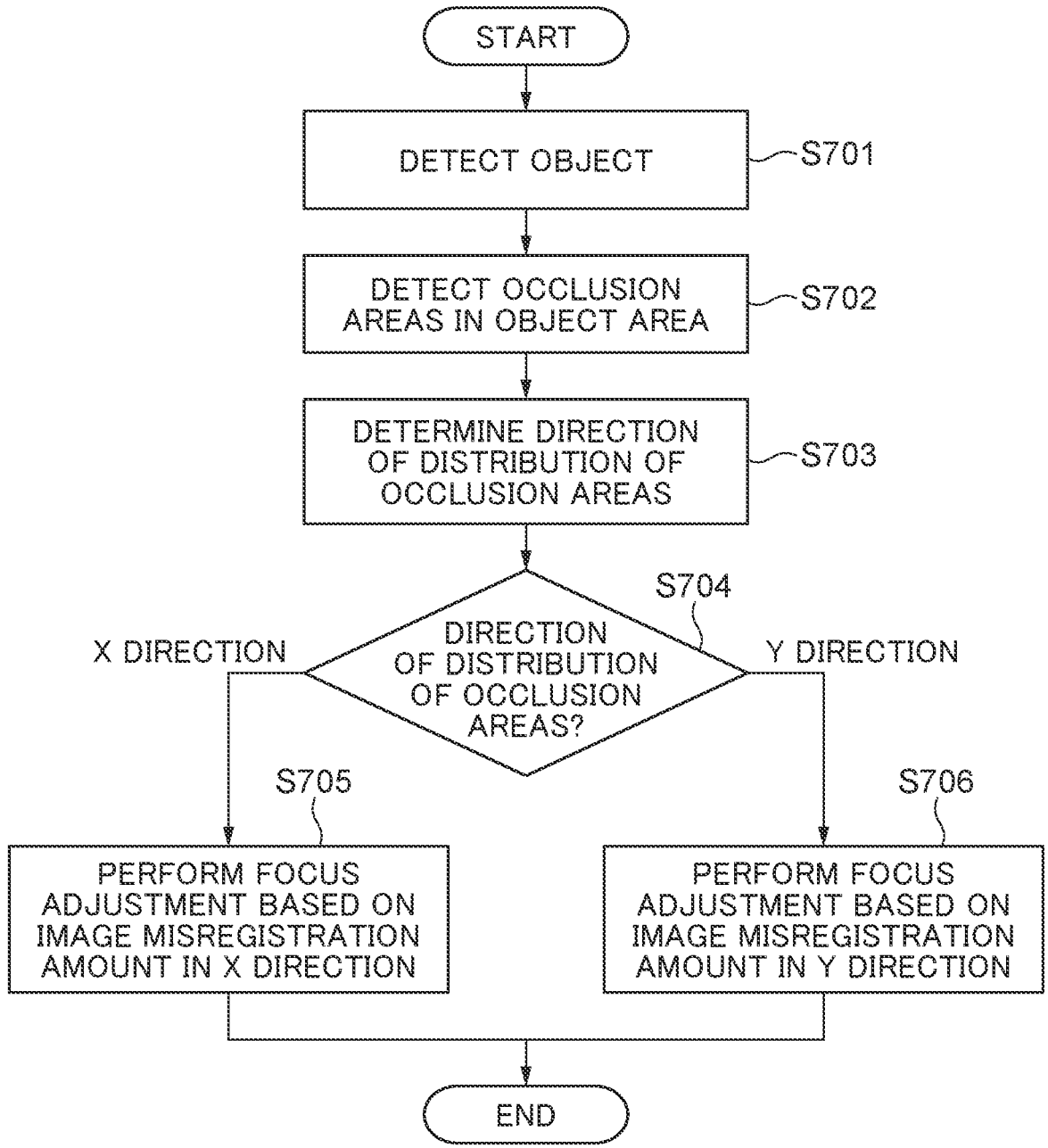

ELECTRONIC APPARATUS REDUCED IN LOWERING OF FOCUS ADJUSTMENT ACCURACY, METHOD OF CONTROLLING SAME, AND STORAGE MEDIUM

BACKGROUND OF THE INVENTION

Field of the Invention

The present invention relates to an electronic apparatus reduced in lowering of focus adjustment accuracy, a method of controlling the same, and a storage medium.

Description of the Related Art

There is used a technique of detecting a pattern of an object (e.g. a face area of a person as an object) from an image captured by an image capturing apparatus, such as a camera. As a related art, there has been proposed a technique disclosed in Japanese Laid-Open Patent Publication (Kokai) No. 2005-318554. The technique of the publication has realized focus adjustment of a human face and exposure control with high accuracy, by performing face area detection for detecting a human face from an image and AF/AE/WB evaluation value detection, on the same frame.

Further, in recent years, for detection of an object from an image, a neural network subjected to deep learning is used. As a neural network suitable for image recognition and the like, a convolution neural network (CNN) is used. For example, a technique for detecting an object in a mage by using the CNN (Single Shot Multibox Detector) is proposed in "Liu, SSD: Single Shot Multibox Detector. In: ECCV2016". Further, a technique for semantically dividing an area in an image (Semantic Image Segmentation) is proposed in "Chen et. al, DeepLab: Semantic Image Segmentation with Deep Convolutional Nets, Atrous Convolution, and Fully Connected CRFs, arXiv, 2016".

Recently, there has been used a method of performing phase difference detection by using a pupil division function and performing focus adjustment by using information on the detected phase difference. When performing shooting, if an object is occluded by some substance, there sometimes occurs an occlusion area in an object area in the image. Depending on the direction of distribution of occlusion areas in the object area, perspective conflict is sometimes caused. If the perspective conflict is caused, there is a problem of lowered focus adjustment accuracy. The technique disclosed in Japanese Laid-Open Patent Publication (Kokai) No. 2005-318554 does not give a solution to this problem.

SUMMARY OF THE INVENTION

The invention provides an electronic apparatus suppressed in occurrence of lowering of focus adjustment accuracy in a case where an occlusion area exists in an object area, a method of controlling the electronic apparatus, and a storage medium.

In a first object of the present invention, there is provided an electronic apparatus, including a processor, and a memory storing a program which, when executed by the processor, causes the electronic apparatus to: acquire an image captured using an image capturing device including a plurality of photoelectric converters to which are incident light fluxes formed by pupil division of an exit pupil of an image capturing optical system in first and second directions, detect an object and occlusion areas of the object from the image, and control focus adjustment based on phase difference information, according to a direction of distribution of the occlusion areas.

In a second object of the present invention, there is provided a method of controlling an electronic apparatus, including acquiring an image captured using an image capturing device including a plurality of photoelectric converters to which are incident light fluxes formed by pupil division of an exit pupil of an image capturing optical system in first and second directions, detecting an object and occlusion areas of the object from the image, and controlling focus adjustment based on phase difference information, according to a direction of distribution of the occlusion areas.

According to the present invention, it is possible to suppress occurrence of lowering of focus adjustment accuracy in a case where an occlusion area exists in an object area.

Further features of the present invention will become apparent from the following description of exemplary embodiments (with reference to the attached drawings).

BRIEF DESCRIPTION OF THE DRAWINGS

FIGS. 3A to 3C are diagrams useful in explaining an example of CNN for inferring the likelihood of an occlusion area.

FIGS. 5A and 5B are diagrams useful in explaining examples of image data, an object area, and a distribution of an occlusion area.

FIG. 7 is a flowchart of a focus adjustment process in a second embodiment.

DESCRIPTION OF THE EMBODIMENTS

The present invention will now be described in detail below with reference to the accompanying drawings showing embodiments thereof. However, the configurations of the following embodiments are described only by way of example and are by no means intended to limit the scope of the present invention to them alone.

Figure 1:
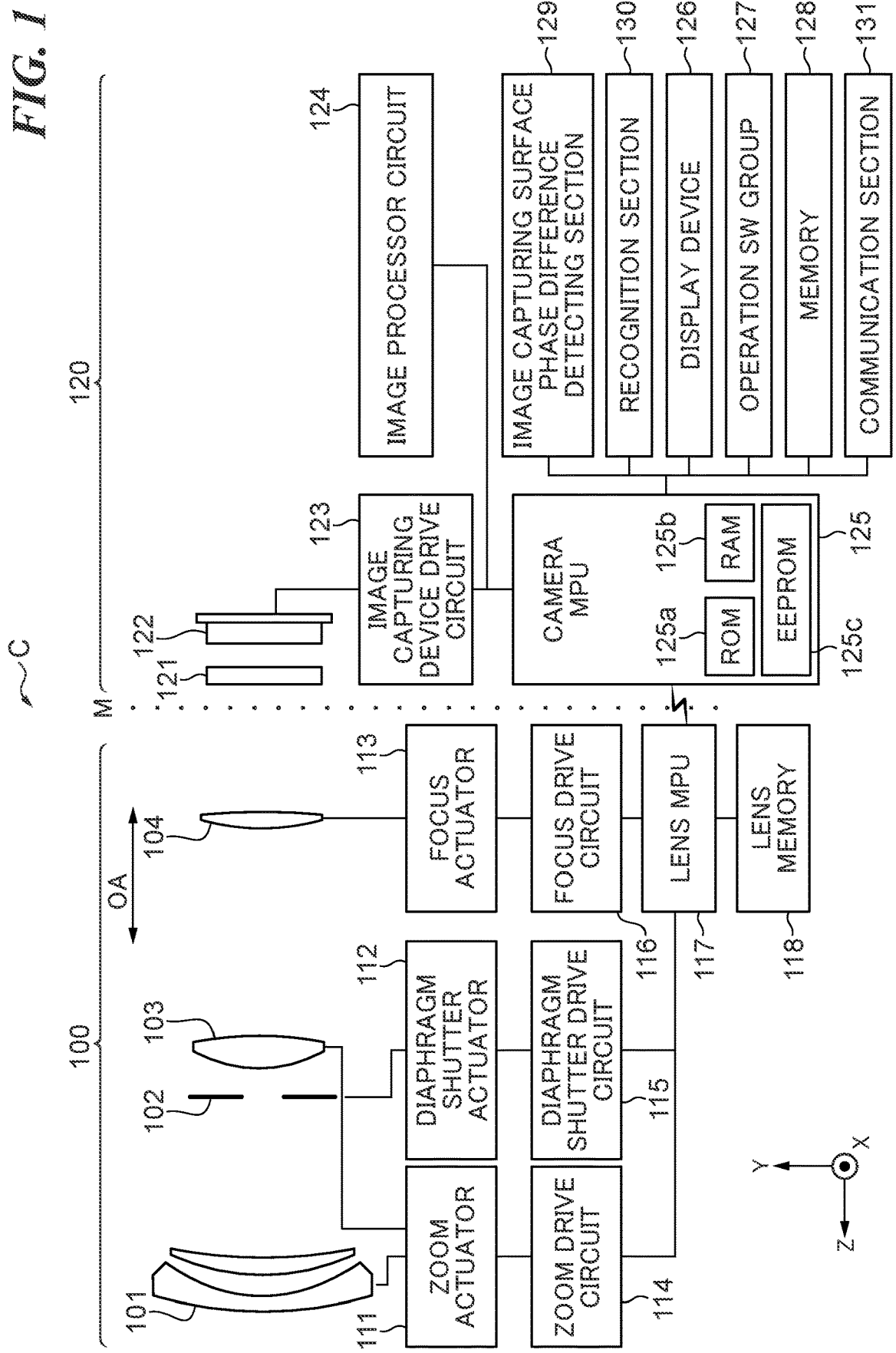
FIG. 1 is a diagram of a digital camera as an electronic apparatus according to embodiments of the present invention.

FIG. 1 is a diagram of a digital camera C as an electronic apparatus according to embodiments of the present invention. The digital camera C is a digital single-lens reflex camera of a lens-exchangeable type. The digital camera C may not be of a lens-exchangeable type. Further, the electronic apparatus is not limited to a digital camera, but it may be a desired device, such as a smartphone or a table terminal.

The digital camera C includes a lens unit 100 which is an image capturing optical system and a camera body 120. The lens unit 100 is removably mounted on the camera body 120 via a mount (lens mount) M indicated by broken lines in a central area in FIG. 1. The lens unit 100 includes an optical system and a drive control system. The optical system includes a first lens group 101, a diaphragm 102, a second lens group 103, and a focus lens 104 (focus lens group). The lens unit 100 is an image capturing lens for forming an optical image of an object.

The first lens group 101 is disposed at a front end of the lens unit 100 and is held such that the first lens group 101 is movable in an optical axis direction OA. The diaphragm 102 has a function of adjusting the amount of light at the time of shooting and also functions as a mechanical shutter that controls exposure time at the time of still image shooting. The diaphragm 102 and the second lens group 103 are capable of moving in the optical axis direction OA in unison, and realizes a zoom function by moving in cooperation of the first lens group 101. The focus lens 101 is also movable in the optical axis direction OA, and an object distance (focal distance) at which the lens unit 100 is brought into focus varies with the position of the focus lens 104. By controlling the position of the focus lens 104 in the optical axis direction OA, focus adjustment for adjusting the focal distance of the lens unit 100 is executed.

The drive control system includes a zoom actuator 111, a diaphragm shutter actuator 112, and a focus actuator 113. Further, the drive control system includes a zoom drive circuit 114, a diaphragm shutter drive circuit 115, a focus drive circuit 116, a lens MPU (microprocessor) 117, and a lens memory 118.

The zoom drive circuit 114 drives the zoom actuator 111 to actuate the first lens group 101 and the second lens group 103 in the optical axis direction OA, thereby controlling the angle of view of the optical system of the lens unit 100. The diaphragm shutter drive circuit 115 drives the diaphragm actuator 112 to actuate the diaphragm 102, thereby performing the control of an aperture diameter of the diaphragm 102 and control of opening/closing operation of the same. The focus drive circuit 116 drives the focus actuator 113 to actuate the focus lens 104 in the optical axis direction OA, thereby changing the focal distance of the optical system of the lens unit 100. Further, the focus drive circuit 116 detects the current position of the focus lens 104 by using the focus actuator 113.

The lens MPU 117 performs a variety of calculations and a variety of controls related to the lens unit 100 to thereby control the zoom drive circuit 114, the diaphragm shutter drive circuit 115, and the focus drive circuit 116. Further, the lens MPU 117 is connected to the camera MPU 125 via the mount M and performs communication related to commands and data with the camera MPU 125. For example, the lens MPU 117 detects the position of the focus lens 104 and notifies lens position information in response to a request from the camera MPU 125. The lens position information includes information on the position of the focus lens 104 in the optical axis direction, information on the position of an exit pupil in the optical axis direction OA and the diameter of the exit pupil in a state in which the optical system is not moving, and information on the position of a lens frame that restricts the light flux from the exit pupil in the optical axis direction and a diameter of the lens frame, and so forth. Further, the lens MPU 117 controls the zoom drive circuit 114, the diaphragm shutter drive circuit 115, and the focus drive circuit 116, in response to requests from the camera MPU 125. The lens memory 118 stores optical information necessary for automatic focus detection in advance. The camera MPU 125 executes a program stored in a nonvolatile memory incorporated therein or the lens memory 118 to thereby control the operation of the lens unit 100.

The camera body 120 includes, similar to the lens unit 100, an optical system and a drive control system. The optical system includes an optical lowpass filter 121 and an image capturing device 122. The image capturing optical system is comprised not only of the first lens group 101, the diaphragm 102, the second lens group 103, and the focus lens 104 of the lens unit 100, but also of the optical lowpass filter 121 of the camera body 120. The optical lowpass filter 121 is a filter that reduces false color and color moiré of a captured image.

The image capturing device 122 is configured to include a CMOS image sensor and a peripheral circuit. The image capturing device 122 receives incident light from the image capturing optical system. In the image capturing device 122, m pixels in a lateral direction and n pixels in a vertical direction (n and m represent integers of not smaller than 2) are arranged. The image capturing device 122 has a pupil division function and is capable of performing phase difference auto focus (AF) using image data. An image processor circuit 124 generates data for the phase difference AF and image data for display and storage, from image data output from the image capturing device 122.

The drive control system includes an image capturing device drive circuit 123, an image processor circuit 124, a camera MPU 125, a display device 126, an operation switch group 127, a memory 128, an image capturing surface phase difference detecting section 129, a recognition section 130, and a communication section 131. The image capturing device drive circuit 123 controls the operation of the image capturing device 122, and performs analog-to-digital conversion of acquired image signals and transmits the resulting signals to the camera MPU 125. The image processor circuit 124 performs, on image data, acquired by the image capturing device 122, typical image processing performed in the digital camera, such as gamma conversion, white balance adjustment processing, color interpolation processing, and compression encoding processing. Further, the image processor circuit 124 also generates signals for the phase difference AF.

The camera MPU 125 performs a variety of calculations and a variety of controls related to the camera body 120. The camera MPU 125 controls the image capturing device drive circuit 123, the image processor circuit 124, the display device 126, the operation switch group 127, the memory 128, the image capturing surface phase difference detection section 129, the recognition section 130, and the communication section 131. The camera MPU 125 is connected to the lens MPU 117 via signal lines of the mount M and performs communication related to commands and data with the lens MPU 117. The camera MPU 125 issues a variety of requests to the lens MPU 117. For example, the camera WL 125 issues requests for information on the lens position and optical information specific to the lens unit 100, and so forth. Further, the camera MPU 125 issues requests for aperture stop, focus lens driving, zoom driving, and so forth, by predetermined drive amounts.

The camera MPU 125 incorporates a ROM 125a, a RAM 125b, and an EEPROM 125c. The ROM (Read Only Memory) 125a stores programs for controlling image capturing operation. The RAM (Random Access Memory) 125b temporarily stores variables. The EEPROM (Electrically Erasable Programmable Read-Only Memory) 125c stores a variety of parameters.

The display device 126 is comprised of a LCD (Liquid Crystal Display), and displays information on a camera shooting mode, a preview image before shooting, a confirmation image after shooting, an in-focus display image during focus detection, and so forth. The operation switch group 127 includes a power switch, a release (shooting trigger) switch, a zoom operation switch, a shooting mode selection switch, and so forth. The memory 128 is a removable flash memory and stores shot images.

The image capturing surface phase difference detection section 129 performs focus detection processing by a phase difference detection method by using data for focus detection acquired from the image processor circuit 124. The image processor circuit 124 generates respective pairs of image data items formed by light fluxes passing through two pairs of pupil regions, as the data for focus detection. Then, the image capturing surface phase difference detection section 129 detects a defocus amount based on the amount of difference between the pairs of the generated image data items. The image capturing surface phase difference detection section 129 performs phase difference AF (image capturing surface phase difference AF) based on an output from the image capturing device 122 without using a dedicated AF sensor. The image capturing surface phase difference detection section 129 may be realized by part of the camera MPU 125, and may be realized by a dedicated circuit, CPU, and the like.

The recognition section 130 performs object recognition based on image data acquired from the image processor circuit 124. The recognition section 130 performs, as the object recognition, object detection for detecting a position in the image data where an object of interest exists and area division for dividing into an object area and an occlusion area where the object is occluded. In the present embodiment, the recognition section 130 determines an area for phase difference information for use in focus adjustment, based on the direction of distribution of occlusion areas and a direction of defocus amount (image shift amount) detection. Hereafter, the direction of image shift amount detection is sometimes referred to as a pupil division direction of phase difference information.

The recognition section 130 performs object detection and area division using the CNN (Convolution Neural Network). In the present embodiment, for the object detection, CNN subjected to deep learning related to object detection is used, and for the area division, CNN subjected to deep learning related to area division is used. However, the recognition section 130 may use CNN subjected to deep learning related to both of object detection and area division.

The recognition section 130 acquires an image from the camera CPU 125 and inputs the same to the CNN subjected to deep learning related to object detection. As an output result of reasoning processing by the CNN, an object is detected. Further, the recognition section 130 inputs an image of the recognized object to the CNN subjected to area division-related deep learning. As an output result of reasoning processing by the CNN, an occlusion area in the image of the object is detected. The recognition section 130 be realized by the camera CPU 125, and alternatively may be realized by a dedicated circuit, CPU, or the like. Further, to perform reasoning processing by the CNN, the recognition section 130 preferably incorporates a GPU for use in calculation processing for the reasoning processing.

The object detection-related CNN deep learning will be described. The CNN deep learning is executed by a desired method. For example, the CNN deep learning is realized by supervised learning using an image on which an object as a correct answer appears as teacher data and a large number of images for learning as input data. At this time, a method, such as a back propagation method, is applied to the CNN deep learning.

The CNN deep learning may be executed by a predetermined computer, such as a server. In this case, the communication section 131 of the camera body 120 may perform communication with a predetermined computer, whereby the CNN subjected to deep learning may be acquired from the predetermined computer. Then, the camera MPU 125 sets the CNN acquired by the communication section 131 in the recognition section 130. This enables the recognition section 130 to perform object detection using the CNN acquired from the communication section 131. In a case where the digital camera C incorporates a high-performance CPU or GPU suitable for deep learning, a dedicated processor specialized for deep learning, or the like, the digital camera C may perform deep learning of the CNN. However, since the deep learning of the CNN requires a plenty of hardware resources, it is preferable that an external apparatus (predetermined computer) performs CNN deep learning and the digital camera C acquires the CNN subjected to deep learning from the external apparatus to use the same.

The object detection may be performed not by CNN but by a desired method. For example, the object detection may realized by a method based on rule base. Further, for the object detection, there may be used a learned model subjected to machine leaning by a desired method, other than the CNN subjected to deep learning. For example, the object detection may be realized by using a learned model subjected to machine learning with a desired machine learning algorithm, such as support vector machine or logistics regression.

Figure 2A:
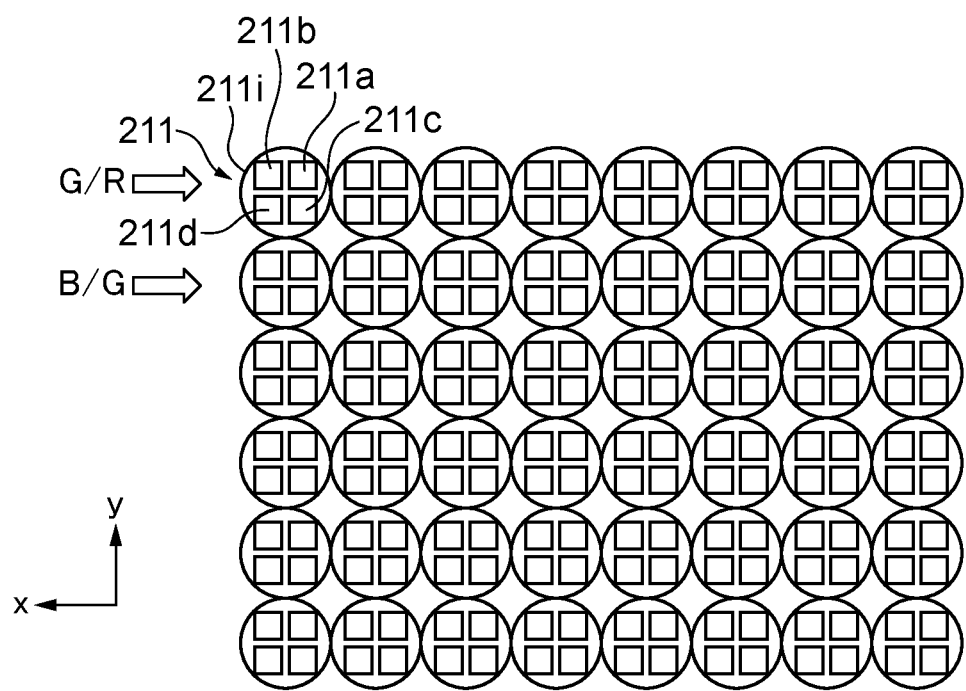
FIGS. 2A and 2B are diagrams illustrating an example of arrangement of pixels of an image capturing device and a direction of pupil division of the pixels.
Figure 2B:
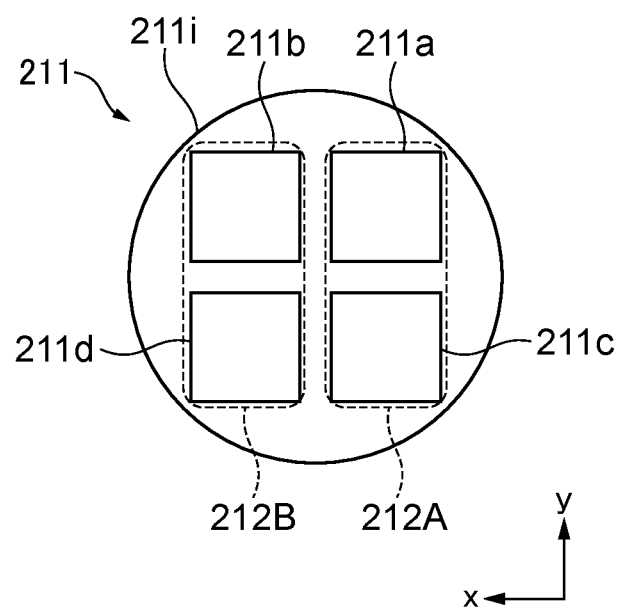

Next, the operation of the image capturing surface phase difference detection section 129 will be described. FIGS. 2A and 2B are diagrams illustrating an example of arrangement of pixels of the image capturing device 122 and a direction of pupil division of the pixels. FIG. 2A shows a range of six rows in a vertical direction (Y direction) and 8 columns in a horizontal direction (X direction) of a two-dimensional C-MOS area sensor, as observed from the lens unit 100 side. In the image capturing device 122, there is provided a color filter in Bayer array in which green (G) filters and red (R) are alternately disposed in each of odd-number rows sequentially from the left, and blue (B) filters and green (G) filters are alternately disposed in each of even-number rows sequentially from the left. In each pixel 211, inside an on-chip micro lens (micro lens 211*i*) indicated by a circle, a plurality of photoelectric converters are arranged. In an example shown in FIG. 2B, four electric converters 211*a*, 211*b*, 211*c*, and 211*d* are arranged inside the on-chip micro lens of the pixel 211.

In the pixel 211, the photoelectric converters 211*a*, 211*b*, 211*c*, and 211*d* are divided in two in the X direction and the Y direction, and it is possible to individually read out photoelectric conversion signals of the individual photoelectric converters and also possible to independently read out the sum of photoelectric conversion signals of each set of individual photoelectric converters. The photoelectric conversion signals of the individual photoelectric converters are used as data for phase difference AF. Further, the photoelectric conversion signals of the individual photoelectric converters are sometimes used for generating parallax images forming a three dimensional (3-D) image. The sum of the photoelectric conversion signals is used for generating ordinary shot image data.

Pixel signals used for performing phase difference AF will be described. In the present embodiment, an exit light flux of the image capturing optical system is pupil-divided using the photoelectric converters 211*a*, 211*b*, 211*c*, and 211*d*. Areas indicated by two broken lines indicate an photoelectric conversion section 211A and a photoelectric conversion section 212B. The photoelectric conversion section 211A is formed by the photoelectric converters 211*a* and 211*c*, and the photoelectric conversion section 211B is formed by the photoelectric converters 211b and 211d. To perform focus detection based on image misregistration amounts (phase differences), an addition signal formed by adding up signals output from the photoelectric converters 211a and 211c and an addition signal formed by adding up signals output from the photoelectric converters 211b and 211d are used in pair. This enables focus detection based on the image misregistration amounts (phase differences) in the X direction.

Here, description is given by focusing on the phase difference AF by focus detection based on the image misregistration amounts in the X direction. For a plurality of pixels 211 disposed on the same pixel row within a predetermined range, an image composed by connecting the addition signals of the photoelectric converters 211a and 211c belonging to the photoelectric conversion section 212A is referred to as an A image for AF, and an image composed by connecting the addition signals of the photoelectric converters 211b and 211d belonging to the photoelectric conversion section 212B is referred to as a B image for AF. As outputs from the photoelectric conversion sections 212A and 212B, there are used pseudo luminance (Y) signals calculated by adding up green, red, blue, green outputs included in a unit array of color filters. However, the A image for AF and the B image for AF may be composed for each of the colors of red, blue, and green. By detecting a relative image misregistration between a pair of image signals of the A image for AF and the B image for AF generated as described above, it is possible to detect a prediction [bit] which is a degree of correlation between the pair of image signals. The camera MPU 125 is capable of detecting a defocus amount [mm] in a predetermined area by multiplying the prediction by a conversion coefficient. In general, the sum of the output signals from the photoelectric conversion sections 212A and 212B forms one pixel (output pixel) of an output image.

Object detection and area division by the recognition section 130 will be described. In the present embodiment, the recognition section 130 detects (recognizes) a human face from an image. As a method of detecting a human from an image, there may be used a desired method (e.g. method of Single Shot Multibox Detector described in "Liu, SSD: Single Shot Multibox Detector. In: ECCV2016". However, the recognition section 130 may detect, in place of a human face, an object which can be a target of focus adjustment, such as a whole human body, an animal, a vehicle, or the like.

The recognition section 130 performs area division related to occlusion area, on a detected object area. As a method of area division, there may be used a desired method (e.g. a method of Semantic Image Segmentation described in "Chen et. al, DeepLab: Semantic Image Segmentation with Deep Convolutional Nets, Atrous Convolution, and Fully Connected CRFs, arXiv, 2016"). The recognition section 130 infers the likelihood of an occlusion area in each pixel area, by using the CNN subjected to deep learning. However, as described hereinabove, the recognition section 130 may infer the occlusion area by using a learned model subjected to machine learning with a desired machine learning algorithm, or may determine the likelihood of an occlusion area based on rule base. In a case where the CNN is used for inference of the likelihood of an occlusion area, the CNN is subjected to deep learning using an occlusion area as a positive example and an area other than the occlusion areas as a negative example. This causes the CNN to output the likelihood of an occlusion area in each pixel area as a result of inference.

Figure 3A:
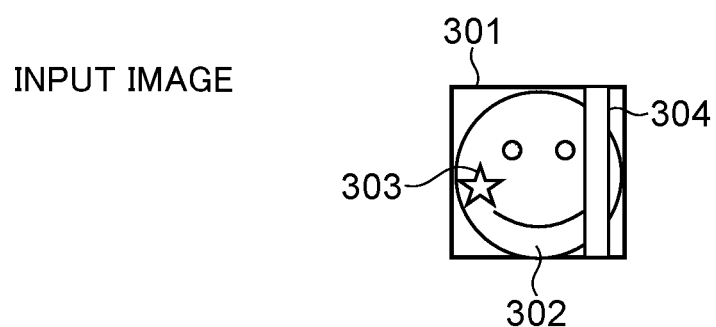

FIGS. 3A to 3C are diagrams useful in explaining an example of CNN for inferring the likelihood of an occlusion area. FIG. 3A shows an example of an object area of an input image input to the CNN. The object area, denoted by reference numeral 301, is calculated from an image by the object detection described above. The object area 301 includes a face area 302 which is a target of the object detection. The face area 302 in FIG. 3A includes two occlusion areas (occlusion areas 303 and 304). The occlusion area 303 is an area with no depth difference, and the occlusion area 304 is an area with a depth difference. The occlusion area is also referred to as an occlusion, and the distribution of the occlusion area is also referred to as an occlusion distribution.

FIG. 3B shows an example of definitions of occlusion information. First to third images shown in FIG. 3B are each divided into white areas and black areas in which the white areas represent positive examples and the black areas represent negative examples. In FIG. 3B, all items of occlusion information indicative of division of areas in an object area are related to images assumed to be candidates of teacher data used when performing deep learning of the CNN. Hereafter, a description will be given of which of the items of occlusion information shown in FIG. 3B is used as teacher data in the present embodiment.

The first image in FIG. 3B is an example of occlusion information in which the image is divided into an area of an object (face area) and areas other than the area of the object wherein the area of the object is a positive example and the areas other than the area of the object are negative examples. The second image in FIG. 3B is an example of occlusion information in which the image is divided into occlusion areas of the foreground of the object and areas other than the occlusion areas of the foreground of the object wherein the occlusion areas of the foreground of the object are positive examples and the areas other than the occlusion areas of the foreground of the object are negative examples. The third image in FIG. 3B is an example of occlusion information in which the image is divided into occlusion areas causing perspective conflict with the object and areas other than the occlusion areas causing the perspective conflict wherein the occlusion areas causing perspective conflict are positive examples and the areas other than the occlusion areas causing the perspective conflict are negative examples.

In the example illustrated in FIG. 2B, the photoelectric converters 211a, 211b, 211c, and 211d are used for pupil division in two in the X direction. In this case, if the occlusion areas in the image are distributed in the Y direction, perspective conflict is liable to be caused. Therefore, teacher data of occlusion areas where perspective conflict is liable to be caused can be generated based on a direction of pupil-division of a plurality of photoelectric converters in pixels.

As illustrated in the first example in FIG. 3B, a person's face in the image is characteristic in visibility pattern and small in pattern dispersion and hence can be divided into areas with high accuracy. For example, as teacher data for learning processing for generating a CNN that detects a person as an object, occlusion information shown in the first example in FIG. 3B is suitable. From the viewpoint of detection accuracy, occlusion information of the first example in FIG. 3B is more suitable than occlusion information of the third example in FIG. 3B. However, as teacher data for learning processing for generating a CNN that detects an occlusion area causing perspective conflict, occlusion information shown in the third example in FIG. 3B is suitable. As the teacher data for learning processing for generating a CNN that detects an occlusion area causing perspective conflict, there may be used parallax images made use of for focus detection. Further, occlusion information is not limited to the above-described examples, but may be generated based on a method of dividing the image into occlusion areas and areas other than the occlusion areas.

FIG. 3C shows a flow of CNN deep learning. In the present embodiment, as an input image 310 for learning, there is used an RGB image. Further, as teacher data, a teacher image 314 (teacher image of occlusion information) as shown in FIG. 3C is used. The teacher image 314 is an image of occlusion information causing perspective conflict in FIG. 3B.

The input image 310 for learning is input to a neural network system 311 (CNN). As the neural network system 311, it is possible to employ a multi-layer structure in which convolution layers and pooling layers are alternately layered between an input layer and an output layer. The output layer 312 shown in FIG. 3C outputs a score map showing the likelihood of occlusion areas in the input image. The score map is output in the form of an output result 313.

In the CNN deep learning, a difference between the output result 313 and the teacher image 314 is calculated as a loss value 315. The loss value 315 is calculated e.g. by using a method, such as cross entropy or square error. Then, coefficient parameters, such as node weights and biases, of the neural network system 311 are adjusted such that the loss value 315 is progressively reduced. By sufficiently performing deep learning of the CNN, using a large number of input images 310 for learning, the neural network system 311 comes to deliver the output result 313 with higher accuracy when an unknown input image is input thereto. More specifically, when an unknown input image is input, the neural network system 311 (CNN) comes to output occlusion information in which occlusion areas and areas other than the occlusion areas are divided, as the output result 313, with high accuracy. Note that it requires a large number of operations to generate teacher data specifying occlusion areas (areas where substances overlap). Therefore, it is envisaged to generate teacher data by making use of CG and by using image synthesis in which substance images are cut out and layered.

The above description is given of an example in which an image such as the third image shown in FIG. 3B in which areas with a depth difference (areas as foreground of an object and has a depth difference larger than a predetermined value) are set as occlusion areas is used as the teacher image 314. Here, as the teacher image 314, there may be used an image such as the second image in FIG. 3B in which areas with no depth difference (areas as foreground of an object and has a depth difference smaller than a predetermined value) are set as occlusion areas. Even if such an image as the second image in FIG. 3B is used as the teacher image 314, it is possible to infer an area causing perspective conflict when an unknown input image is input to the CNN. However, the use of such an image as the third image in FIG. 3B in which areas with a depth difference are set as occlusion areas contributes to improvement of the accuracy of inference of occlusion areas causing perspective conflict by CNN.

Not CNN but a desired method can be applied to detection of occlusion areas. For example, detection of an occlusion area may be realized by a method based on base rule. Further, besides the CNN subjected to deep learning, a learned model subjected to machine learning by a desired method may be applied to detection of occlusion areas. For example, occlusion areas may be detected by using a learned model subjected to machine learning with a desired machine learning algorithm, such as support vector machine or logistics regression. This is also the case with object detection.

Figure 4:
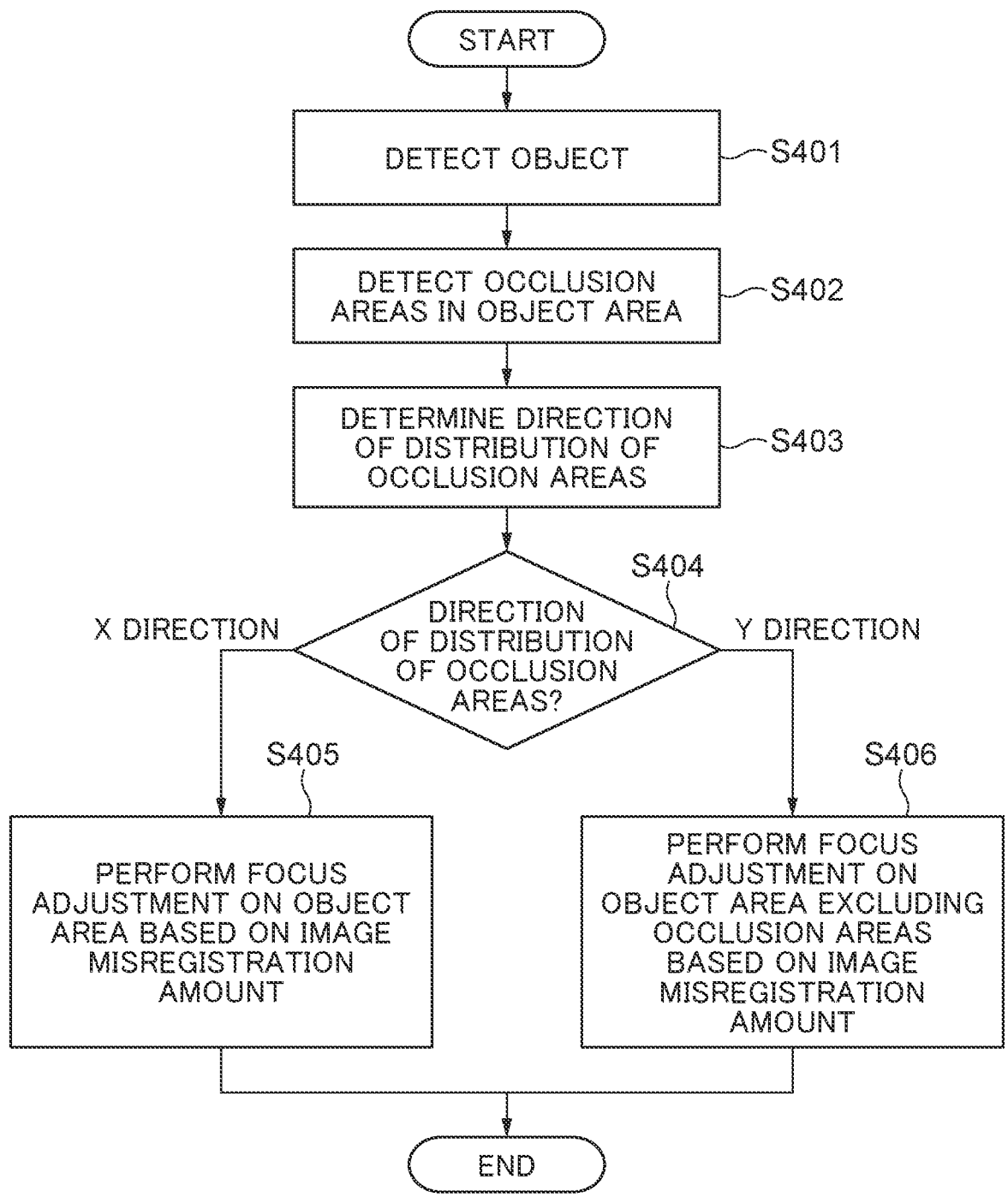
FIG. 4 is a flowchart of a focus adjustment process in a first embodiment.

Next, a focus adjustment process will be described. FIG. 4 is a flowchart of the focus adjustment process in the first embodiment. When performing focus adjustment, the camera MPU 125 determines a reference area for focus adjustment based on a pupil division direction for phase difference detection ad a direction of distribution of occlusion areas detected by the recognition section 130.

In a step S401, the recognition section 130 detects an object from an image acquired from the image processor circuit 124 via the camera MPU 125, by using the CNN that performs object detection. The recognition section 130 may detect an object from the image, by using a method other than CNN. In a step S402, the recognition section 130 detects occlusion areas in an object area detected from the image. In doing this, the recognition section 130 inputs an image acquired from the image processor circuit 124 as an input image to the CNN described with reference to FIGS. 3A to 3C. In a case where the CNN is sufficiently trained, an image output from the CNN as a result allows the recognition section 130 to discriminate between occlusion areas and areas other than the occlusion areas. The recognition section 130 detects the occlusion areas from the image output from the CNN.

In a step S403, the recognition section 130 determines a direction of distribution of the detected occlusion areas. For example, the recognition section 130 may compare between an edge integral value of edge values integrated in the X direction and an edge integral value of edge values integrated in the Y direction and determines a direction of a smaller one of the edge integral values in which the edge values are integrated, as a direction of distribution of occlusion areas. FIGS. 5A and 5B are diagrams showing examples of distribution of an occlusion area in an object area of image data.

FIG. 5A is a diagram showing an example of a case where an occluding substance (e.g. a bar) extending in the X direction exists between the digital camera C and an object. In an image 500 (image data) acquired from the image processor circuit 124, an occluding substance 502 appears such that it occludes an object 501. The recognition section 130 detects an object area 510 from the image 500. The object area 510 includes an object 511 and an occluding substance 512. The occluding substance 512 occludes the object 511 in the X direction.

When the image 500 including the object area 510 is input to the CNN, the recognition section 130 delivers an output result 520 as a result of inference performed on the object area 510. The output result 520 includes an occlusion area 522 and an area 521 other than the occlusion area 522. The occlusion area 522 has an area distribution corresponding to the occluding substance 512. In the example shown in FIG. 5A, the occlusion area 522 is distributed in the X direction. The recognition section 130 compares between an edge integral value of edge values in the output result 520 integrated in the X direction and an edge integral value of edge values in the same integrated in the Y direction and determines the X direction in which the edge integral value is smaller, as the direction of distribution of occlusion areas.

FIG. 5B is a diagram showing example of a case where an occluding substance extending in the Y direction exists between the digital camera C and an object. In an image 550 acquired from the image processor circuit 124, an occluding substance 552 appears such that it occludes an object 551. The recognition section 130 detects an object area 560 from the image 550. The object area 560 includes an object 561 and an occluding substance 562. The occluding substance 562 occludes the object 551 in the X direction.

When the image 550 including the object area 560 is input to the CNN, the recognition section 130 delivers an output result 570 as a result of inference performed on the object area 560. The output result 570 includes an occlusion area 572 and an area 571 other than the occlusion area 572. The recognition section 130 determines a direction of distribution of occlusion areas by the same method as used in the case of FIG. 5A. In the example of FIG. 5B, the recognition section 130 determines that direction of distribution of occlusion areas is the Y direction. Thus, the recognition section 130 is capable of determining the direction of distribution of occlusion areas.

Referring again to FIG. 4, processing performed in a step S404 et seq. will be described. In the step S404, the camera MPU 125 determines whether the direction of distribution of occlusion areas is the X direction or the Y direction. When the camera MPU 125 determines that the direction of distribution of occlusion areas is the X direction, the process proceeds to a step S405, whereas when the camera MPU 125 determines that the direction of distribution of occlusion areas is the Y direction, the process proceeds to a step S406. In the step S404, even if the direction of distribution of occlusion areas does not completely match the X direction, the camera MPU 125 may determine that the direction of distribution of occlusion areas is the X direction, insofar as the direction of distribution of occlusion areas is within a predetermined angle range from the X direction. Similarly, in the step S404, even if the direction of distribution of occlusion areas does not completely match the Y direction, the camera MPU 125 may determine that the direction of distribution of occlusion areas is the Y direction, insofar as the direction of distribution of occlusion areas is within a predetermined angle range from the Y direction.

In the step S405, the camera MPU 125 performs control of focus adjustment on an area (object area) where an object is detected, based on an amount of image misregistration. In a case where the direction of distribution of occlusion area is the X direction, the possibility of occurrence of perspective conflict between amounts of misregistration (phase difference) in the X direction is low. In this case, the image capturing surface phase difference detection section 129 executes focus detection based on the amount of misregistration (phase difference) in the X direction by referring to the whole object area. Then, based on the amount of image misregistration detected by the image capturing surface phase difference detection section 129, the camera MPU 125 control of focus adjustment. Note that the image capturing surface phase difference detection section 129 may execute focus detection based on the amount of image misregistration (phase difference) in the X direction, by excluding the occlusion areas in the object area. After executing the step S405, the process in FIG. 4 is terminated.

In the step S406, the camera MPU 125 performs control of focus adjustment on the object area excluding the occlusion areas, based on an amount of image misregistration. In a case where the direction of distribution of occlusion areas is the Y direction, the possibility of occurrence of perspective conflict between amounts of misregistration (phase difference) in the X direction is high. In this case, the image capturing surface phase difference detection section 129 executes focus detection based on the amount of misregistration (phase difference) in the X direction by referring to the object area excluding occlusion areas.

In a case where the object area includes a plurality of correlation calculation blocks and also these correlation calculation blocks include a correlation calculation block containing no occlusion areas, the image capturing surface phase difference detection section 129 executes focus detection, based on an amount of image misregistration in the correlation calculation block. On the other hand in a case where the object area includes a plurality of correlation calculation blocks and also these correlation calculation blocks include no correlation calculation block containing no occlusion areas, the image capturing surface phase difference detection section 129 calculates an amount of image misregistration, by shifting a correlation calculation block such that the correlation calculation block comes to contain no occlusion areas. Then, the image capturing surface phase difference detection section 129 executes focus detection based on the calculated amount of image misregistration. After executing the step S406, the process in FIG. 5 is terminated.

As described heretofore, according to the first embodiment, a direction of distribution of occlusion areas in an object area in a captured image is detected, and an area used for focus detection is controlled according to the detected direction of distribution of occlusion areas and a. This suppresses lowering of the accuracy of focus adjustment from being caused by perspective conflict. In the first embodiment, as shown in FIG. 2B, an example in which the direction of pupil division of each pixel of the image capturing device 122 is the X direction is shown, and the first embodiment can be applied even in a case where the direction of pupil division of each pixel is the Y direction.

Next, a second embodiment will be described. In the second embodiment, the digital camera C is capable of calculating an amount of image misregistration in the horizontal direction (X direction) and an amount of image misregistration in the vertical direction (Y direction). Therefore, the digital camera can switch the direction of pupil division between the X direction and the Y direction. The digital camera C according to the second embodiment has the same configuration as described with reference to FIG. 1, and hence redundant description thereof is omitted.

Figure 6:
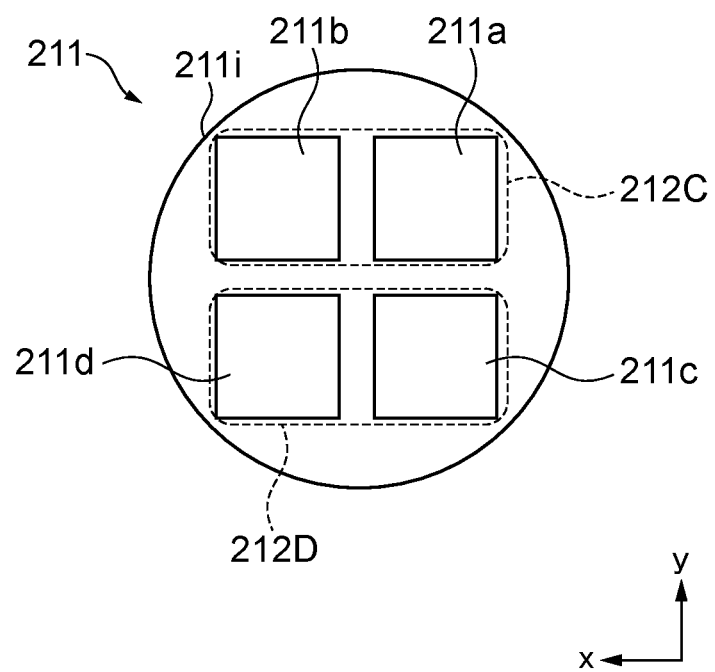
FIG. 6 is a diagram showing an example in which a direction of pupil division of pixels is a Y direction.

The amount of image registration in the X direction is calculated similar to the first embodiment. Calculation of the amount of image misregistration in the Y direction will be described. FIG. 6 is a diagram showing an example in which the direction of pupil division of pixels is the Y direction. Similar to FIG. 2B, in the pixel 211, the photometric converters 211a, 211b, 211c, and 211d are capable of performing pupil division in both of the X direction similarly to FIG. 2B and the Y direction as shown in FIG. 6. Out of the photometric converters 211a, 211b, 211c, and 211d, a photoelectric converter section 212C is formed by the photoelectric converters 211a, and 211b. Out of the photometric converters 211a, 211b, 211c, and 211d, a photoelectric converter section 212D is formed by the photoelectric converters 211c and 211d.

In the second embodiment, an addition signal formed by adding output signals from the photoelectric converters 211a and 211b belonging to the photoelectric converter section 212C and an addition signal formed by adding output signals from the photoelectric converters 211c and 211d belonging to the photoelectric converter section 212D are used in pair. This makes it possible to perform focus detection based on the amount of image misregistration (phase difference) in the Y direction. The correlation calculation is performed similar to the first embodiment only except that the direction of pairing is not the X direction but the Y direction.

Further, in the second embodiment, the direction of pupil division of the pixel 211 can be switched between the X direction and the Y direction. For example, by controlling the camera MPU 125, the image capturing device drive circuit circuit 123 may perform switching between reading the signals output from the photoelectric converter sections 212A and 212B and reading the signals output from the photoelectric converter sections 212C and 212D in the second embodiment. This makes it possible to switch the direction of pupil division between the X direction and the Y direction.

FIG. 7 is a flowchart of a focus adjustment process in the second embodiment. Steps S701 to S703 are the same as the steps S401 to S403, description thereof is omitted. However, for deep learning of CNN, there are used both of a teacher image in which occlusion areas are distributed in the X direction and a teacher image in which occlusion areas are distributed in the Y direction. This makes it possible to infer existence of occlusion areas distributed in the X direction and the Y direction, as an output result, by using the CNN, using an input of an unknown input image. The deep learning of the CNN is the same as described in the first embodiment.

In a step S704, it is determined based on a result of determination in the step S703 whether the direction of distribution of occlusion areas is the X direction or the Y direction. When the camera MPU 125 determines in the step S704 that the direction of distribution of occlusion areas is the X direction, the process proceeds to a step S705, whereas the camera MPU 125 determines in the step S704 that the direction of distribution of occlusion areas is the Y direction, the process proceeds to a step S706.

In the step S705, the camera MPU 125 controls the focus adjustment based on the amount of image misregistration in the X direction by switching the direction of pupil division. In a case Where the direction of distribution of occlusion areas is the X direction, the possibility of occurrence of perspective confliction in the amount of misregistration (phase difference) in the X direction is low. In this case, the image capturing surface phase difference detection section 129 executes focus detection based on the amount of image misregistration (phase difference) in the X direction. In the step S705, the image capturing surface phase difference detection section 129 does not execute focus detection based on the amount of misregistration (phase difference) in the Y direction Then, the camera MPU 125 performs control of focus detection based on the amount of image misregistration detected by the image capturing surface phase difference detection section 129. After execution of the step S705, the process in FIG. 7 is terminated.

In the step S706, the camera MPU 125 controls the focus adjustment based on the amount of image misregistration in the Y direction by switching the direction of pupil division. In a case where the direction of distribution of occlusion areas is the Y direction, the possibility of occurrence of perspective conflict in the amount of misregistration (phase difference) in the Y direction is low. In this case, the image capturing surface phase difference detection section 129 executes focus detection based on the amount of image misregistration (phase difference) in the Y direction. In the step S706, the image capturing surface phase difference detection section 129 does not execute focus detection based on the amount of misregistration (phase difference) in the X direction Then, the camera MPU 125 performs control of focus detection based on the amount of image misregistration detected by the image capturing surface phase difference detection section 129. After execution of the step S706, the process in FIG. 7 is terminated.

As described above, according to the second embodiment, the direction of pupil division of the pixel 211 is switchable between the X direction and the Y direction, and the control of focus adjustment based on the phase difference information is executed by switching the direction of pupil division according to the direction of distribution of occlusion areas. This suppresses occurrence of lowering of the accuracy of focus adjustment caused by perspective conflict in a case where occlusion areas exist in the object area, irrespective of whether the direction of distribution of occlusion areas is the X direction or the Y direction.

A direction based on a direction of contrast (direction of higher contrast) in the object area excluding the occlusion areas may be preferentially selected as a direction of phase difference information when executing control of focus adjustment. In this case, the camera MPU 125 performs focus adjustment based on the amount of image misregistration (phase difference), not according to the direction of pupil division and the direction of distribution of occlusion areas but according to a direction of contrast in the object area excluding the occlusion areas. If there is no contrast in the object area, an object as a target cannot be detected even if perspective conflict can be avoided, and hence the focus adjustment can not be performed. Therefore, the camera MPU 125 performs focus adjustment based on an amount of image misregistration in the direction where contrast exists in the object area excluding the occlusion areas. This point is the same as in the first embodiment.

Further, in a case where the camera MPU 125 is low in the contrast of occlusion areas (the value indicative of contrast is lower than a predetermined threshold value), neither the step S705 nor the S706 may be executed depending on the result of determination in the step S704. This is because even when an occlusion area occurs in an image captured by the digital camera C, the adverse influence of perspective conflict is low in an occluding substance and an boundary between the occluding substance and the object. This makes it possible to omit the processing in the step S705 and the processing in the step S706, which are dependent on the result of determination in the step S704.

Next, a variation will be described. In the embodiments described above, the description is given of cases where machine learning is performed by supervised learning using teacher images in which occlusion areas are set as positive examples and areas other than the occlusion areas are set as negative examples, and a direction of distribution of occlusion areas is detected from an image. However, a learned model subjected to machine leaning by unsupervised learning may be used in the embodiments. In this case, for example, images for learning in which occlusion regions occluding an object are distributed in the X direction and images for leaning in which occlusion regions occluding an object are distributed in the Y direction are used for machine learning. By executing to machine learning by unsupervised machine learning using the images for learning, a learned model to be used in the embodiments may be generated. Then, the generated learned model is used for detection of occlusion areas.

For example, when an image in which occlusion areas occluding an object in an object area are distributed in the X direction is input to the learned model described above, occlusion areas distributed in the X direction are extracted as feature values from the image, whereby the input image is classified as an image in which occlusion areas are distributed in the X direction. Similarly, when an image in which occlusion areas occluding an object in an object area are distributed in the Y direction is input to the learned model described above, occlusion areas distributed in the Y direction are extracted as feature values from the image, whereby the input image is classified as an image in which occlusion areas are distributed in the Y direction. This makes it possible to determine a direction of distribution of occlusion areas.

By using a learned model subjected to machine learning by unsupervised learning, as the learned model for detecting occlusion areas, there is no need to provide teacher data (teacher images). As an algorithm of machine learning by unsupervised learning, there may be used clustering, principal component analysis, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-023506, filed Feb. 17, 2021, which is hereby incorporated by reference herein in its entirety.

What is claimed is:

1. An electronic apparatus, comprising:
   a processor; and
   a memory storing a program which, when executed by the processor, causes the electronic apparatus to:
   acquire an image captured using an image capturing device including a plurality of photoelectric converters to which are incident light fluxes formed by pupil division of an exit pupil of an image capturing optical system in first and second directions;
   detect an object and occlusion areas of the object from the image; and
   control focus adjustment based on phase difference information, according to a direction of distribution of the occlusion areas.

2. The electronic apparatus according to claim 1, wherein the program when executed by the processor further causes the electronic apparatus to select one of the first direction and the second direction according to the direction of distribution of the occlusion areas, for control of the focus adjustment.

3. The electronic apparatus according to claim 2, wherein the phase difference information in a direction different from a selected one of the directions of the pupil division is not used for the control of the focus adjustment.

4. The electronic apparatus according to claim 2, wherein the first and second directions are a horizontal direction and a vertical direction.

5. The electronic apparatus according to claim 4, wherein if the direction of distribution of the occlusion areas is the horizontal direction, light fluxes formed by pupil division in the horizontal direction are used, whereas if the direction of distribution of the occlusion areas is the vertical direction, light fluxes formed by pupil division in the vertical direction are used.

6. The electronic apparatus according to claim 1, wherein the control of the focus adjustment based on the phase difference information in a direction in which contrast exists in the object area excluding the occlusion areas is performed in preference to the control of the focus adjustment based on the direction of distribution of the occlusion areas.

7. The electronic apparatus according to claim 1, wherein the control of the focus adjustment based on the direction of distribution of the occlusion areas is not executed in a case where a value indicative of contrast in the occlusion areas is lower than a predetermined value.

8. The electronic apparatus according to claim 1, wherein based on a likelihood of occlusion areas obtained by inputting the captured image to a learned model subjected to machine learning using a plurality of teacher images in which occlusion areas in the object area are set as positive examples and areas other than the occlusion areas are set as negative examples, occlusion areas are detected from the image.

9. The electronic apparatus according to claim 8, wherein the occlusion areas in each teacher image are a foreground area existing in an object area of the teacher image.

10. The electronic apparatus according to claim 9, wherein the occlusion areas in each teacher image are areas in which a depth difference is not smaller than a predetermined value.

11. The electronic apparatus according to claim 1, wherein by inputting the captured image to a learned model subjected to machine learning by unsupervised learning using a plurality of images for learning in which occlusion areas in an object area are distributed in a horizontal direction and a plurality of images for learning in which occlusion areas are distributed in a vertical direction, occlusion areas are detected from the image.

12. A method of controlling an electronic apparatus, comprising:
   acquiring an image captured using an image capturing device including a plurality of photoelectric converters to which are incident light fluxes formed by pupil division of an exit pupil of an image capturing optical system in first and second directions;
   detecting an object and occlusion areas of the object from the image; and controlling focus adjustment based on phase difference information, according to a direction of distribution of the occlusion areas.

13. A non-transitory computer-readable storage medium storing a program for causing a computer to execute a method of controlling an electronic apparatus,
wherein the method comprises:
acquiring an image captured using an image capturing device including a plurality of photoelectric converters to which are incident light fluxes formed by pupil division of an exit pupil of an image capturing optical system in first and second directions;
detecting an object and occlusion areas of the object from the image; and
controlling focus adjustment based on phase difference information, according to a direction of distribution of the occlusion areas.

\* \* \* \* \*